(12) United States Patent
Kim

(10) Patent No.: US 8,429,571 B2
(45) Date of Patent: Apr. 23, 2013

(54) METHOD OF ETCH PROXIMITY CORRECTION AND METHOD OF CREATING PHOTOMASK LAYOUT USING THE SAME

(75) Inventor: Sangwook Kim, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/161,985

(22) Filed: Jun. 16, 2011

(65) Prior Publication Data

US 2011/0314431 A1 Dec. 22, 2011

(30) Foreign Application Priority Data

Jun. 18, 2010 (KR) .................. 10-2010-0058205

(51) Int. Cl.
*G06F 17/50* (2006.01)

(52) U.S. Cl.
USPC ............ 716/53; 716/50; 716/51; 716/52; 716/54; 716/55; 716/56

(58) Field of Classification Search ........... 716/50–56
See application file for complete search history.

(56) References Cited

U.S. PATENT DOCUMENTS

| 6,337,162 | B1 * | 1/2002 | Irie ................................ 430/5 |
| 6,677,088 | B2 * | 1/2004 | Magome et al. .................. 430/5 |
| 7,207,029 | B2 * | 4/2007 | Beale et al. ..................... 716/53 |
| 7,234,129 | B2 * | 6/2007 | Beale et al. ..................... 716/53 |
| 7,340,713 | B2 * | 3/2008 | Beale .............................. 716/53 |
| 7,600,212 | B2 * | 10/2009 | Zach et al. ...................... 716/50 |
| 7,849,423 | B1 * | 12/2010 | Yenikaya et al. ............ 716/132 |
| 8,078,995 | B2 * | 12/2011 | Tirapu Azpiroz et al. ...... 716/53 |
| 2010/0010784 | A1 * | 1/2010 | Cao et al. .......................... 703/1 |
| 2010/0251202 | A1 * | 9/2010 | Pierrat ............................ 716/20 |
| 2012/0314194 | A1 * | 12/2012 | Onvlee et al. ................... 355/53 |

FOREIGN PATENT DOCUMENTS

| KR | 1020090066924 | 6/2009 |
| KR | 1020090071736 | 7/2009 |

\* cited by examiner

*Primary Examiner* — Helen Rossoshek
(74) *Attorney, Agent, or Firm* — Stanzione & Kim, LLP

(57) ABSTRACT

Provided is an etch proximity correction method in which an accurate etch bias value is calculated. The etch proximity correction method includes creating an etch bias value from a project area corresponding to an area blocked by a pattern region within a linear distance projected from a target position selected in a target layout to an outermost portion of the proximity region and a non-project area corresponding to an area projected into an edge linear distance from an edge of the pattern region blocked in the linear distance to the outermost portion of the proximity region and correcting the target position in the layout using the etch bias value. Since an etch bias model includes the project area and the non-project area, the accurate etch bias value may be calculated.

20 Claims, 19 Drawing Sheets

METHOD OF ETCH PROXIMITY CORRECTION AND METHOD OF CREATING PHOTOMASK LAYOUT USING THE SAME

CROSS-REFERENCE TO RELATED APPLICATIONS

This U.S. non-provisional patent application claims priority under 35 U.S.C. §119 from Korean Patent Application No. 10-2010-0058205, filed on Jun. 18, 2010, in the Korean Intellectual Property Office, the entire contents of which are hereby incorporated by reference.

BACKGROUND OF THE INVENTION

1. Field of the Invention

The present disclosure herein relates to an etch proximity correction method, and more particularly, to a method of etch proximity correction for correcting a layout using an etch bias value and a method of creating a photomask layout using the same.

2. Description of the Related Art

With the development of micro-photolithography technology, a scale reduction of an integrated circuit is accelerating further. Thus, a pattern transferred onto a wafer may have a size less than a wavelength of an exposed beam. Accordingly, an optical proximity correction (OPC) for correcting diffraction and interference of light is recognized as being necessary to form a fine pattern having further accuracy and reliability. As fine patterns are adjacent to each other together with the OPC process, requirements of etch proximity correction for minimizing etch effects are being increased.

SUMMARY OF THE INVENTION

The present disclosure provides an etch proximity correction method in which an accurate etch bias value is calculated.

The present disclosure also provides a method of creating a photomask layout using an etch proximity correction method.

Additional features, utilities and advantages of the present general inventive concept will be set forth in part in the description which follows and, in part, will be obvious from the description, or may be learned by practice of the general inventive concept.

Embodiments of the inventive concept provide etch proximity correction methods for calculating an etch bias value including a non-project area in which a linear distance connected from a target position to the outermost portion of a proximity region is bent at an edge of a pattern region. The methods of the etch proximity correction include: setting a target position within a pattern region of a layout, setting a proximity region affecting an etch reaction at the target position when an etch process is performed in the pattern region, creating an etch bias value from a project area corresponding to an area blocked by the pattern region within a linear distance projected from the target position to the outermost portion of the proximity region and a non-project area corresponding to an area projected into an edge linear distance from an edge of the pattern region blocked in the linear distance to the outermost portion of the proximity region, and correcting the target position in the layout using the etch bias value.

In some embodiments, the etch bias value may be determined from an etch bias model comprising a function of a visible area, a blocked area, and a density.

The etch bias value may be predicted from an etch bias model corresponding to the sum of the visible area, the blocked area, and the density. An etch bias model may predict a difference of local etch bias values according to a variation of a global etch bias value involved during the etch process. The blocked area may correspond to an area occupied by the pattern region within the proximity region. The density may correspond to a ratio of the pattern region to the proximity region.

In other embodiments, the visible area may include the project area and the non-project area. The project area may include an open project area of a space region or a bare region, which is not blocked by the pattern region in the linear distance from the target position to the outermost portion of the proximity region. The project area may include a block project area blocked by the pattern region within the linear distance. The open project area may correspond to an arc area calculated from a radius and azimuthal angle of the proximity region. The block project area may correspond to a triangular area calculated from the linear distance and the azimuthal angle.

In still other embodiments, the non-project area may include a first non-project area projected into a first edge linear distance from a first edge of the pattern region blocked in the linear distance to the outermost portion of the proximity region and a second non-project area projected into a second edge linear distance from a second edge of the pattern region blocked in the first edge linear distance to the outermost portion of the proximity region. The first non-project area may be calculated from a first edge radius and a first edge azimuthal angle, which is rotated until the first edge linear distance meets the second edge from the project area. The first non-project area may be disposed between the project area and the second non-project area. The second non-project area may be calculated from the second edge linear distance and the second edge azimuthal angle, which is rotated until the second edge linear distance meets the pattern region.

In even other embodiments, the non-project area may include an open non-project area, which is not blocked by the pattern region within the first edge linear distance or the second edge linear distance and a block non-project area blocked by the pattern region within the edge linear distance. The open non-project area may include a first open non-project area of the first non-project area and a second open non-project area of the second non-project area. The block non-project area may include a first block non-project area of the first non-project area and a second block non-project area of the second non-project area.

In yet other embodiments, the open non-project area may include an arc area calculated from the first edge linear distance or the second edge linear distance and a first edge azimuthal angle or a second edge azimuthal angle, and wherein the first edge linear distance or the second edge linear distance are rotated in the first edge azimuthal angle and the second edge azimuthal angle, respectively. The first edge linear distance or the second edge linear distance may be varied according to the first edge azimuthal angle or the second edge azimuthal angle, respectively.

In further embodiments, the block non-project area may include a triangular area calculated from the first edge linear distance or the second edge linear distance and a trigonometric function of a first edge azimuthal angle or a second edge azimuthal angle, and wherein the first edge linear distance or the second edge linear distance are rotated in the first edge azimuthal angle and the second edge azimuthal angle, respectively. Similarly, the first edge linear distance or the second edge linear distance may be varied according to the first edge azimuthal angle or the second edge azimuthal angle, respectively.

In still further embodiments, the etch bias value of the visible area may be calculated from a visible kennel function. The visible kennel function may correspond to the sum of the etch bias value of the project area and the etch bias value of the non-project area.

In even further embodiments, the visible kennel function may include a surface integral of the project area, which multiplies a first function depending on a variation of the linear distance by a second function depending on variations of the linear distance and the azimuthal angle. The first function may include at least one of an inverse function of the linear distance and a Gaussian distribution function of the linear distance. The second function may include at least one of a constant, a trigonometric function of the azimuthal angle, an exponential function of the azimuthal angle, and an exponential function of an ellipticity of the linear distance and the azimuthal angle.

In yet further embodiments, the visible kennel function further may include a surface integral of the non-project area, which multiplies a third function depending on a variation of the edge linear distance from an edge position at which the linear distance meets the pattern region to the outermost portion of the proximity region by a fourth function depending on variation of an edge azimuthal angle and an edge linear distance at the edge position. The third function may include at least one of a constant, a proportion function of the edge linear distance, an inverse function of the edge linear distance, an exponential function of the edge linear distance, and a Gaussian distribution function of the edge linear distance. The fourth function may include at least one of a trigonometric function of the edge azimuthal angle, an exponential function of the edge azimuthal angle, and an exponential function of an ellipticity of the edge linear distance and the edge azimuthal angle.

In yet further embodiments, the pattern region may include a target pattern in which the target position is selected and at least one neighboring pattern adjacent to the target pattern within the proximity region of the target position. Each of the target pattern and the neighboring patterns may have a polygonal shape such as a triangular shape, a square shape, a pentagonal shape, or a hexagonal shape, and a circular shape.

In yet further embodiments, when the target pattern has an independent line shape having a length less than the linear distance of the proximity region, the non-project area may be calculated from an edge linear distance from a first edge of the target pattern meeting the linear distance to the outermost portion of the proximity region and an edge azimuthal angle at which the edge linear distance meets a second edge of the target pattern from the project region. Also, the non-project area may be calculated from an edge linear distance from a first edge of the neighboring pattern meeting the linear distance to the outermost portion of the proximity region and an edge azimuthal angle at which the edge linear distance meets a second edge of the neighboring pattern from the project region.

In other embodiments of the inventive concept, methods of creating a photomask layout include: designing a target layout including a pattern region, selecting a target pattern within the target layout, and performing etch proximity correction, wherein the performing of the etch proximity correction includes: setting a target position in the target pattern, setting a proximity region affecting an etch reaction at the target position when an etch process is performed in the pattern region, creating an etch bias value from a project area corresponding to an area blocked by the pattern region within a linear distance projected from the target position to the outermost portion of the proximity region and a non-project area corresponding to an area projected into an edge linear distance from an edge of the pattern region blocked in the linear distance to the outermost portion of the proximity region, and correcting the target position in the layout using the etch bias value.

In some embodiments, the methods may further include: creating a measurement layout after developing after the etch proximity correction is performed, and performing optical proximity correction of the pattern region in the measurement layout after developing. The photomask layout may be created by reversely performing a photolithography process. The photolithography process may include an exposure process for forming a photoresist pattern from the photomask layout, a measuring process after developing of the photoresist pattern, and an etch process of a wafer, which uses the photoresist pattern as an etch mask layer. On the other hand, the method of creating the photomask layout may include designing the target layout to be formed on a surface of the wafer in which the etch process is completed, performing the etch proximity correction in consideration of an etch bias during the etch process, and creating the measurement layout after developing, and performing the optical proximity correction in the exposure process.

In other embodiments, the optical proximity correction may be performed using the same function as that of the etch proximity correction and a model having weighting factors different from each other. The optical proximity correction may be calculated from the visible kennel function. Also, the bias value in consideration of the project area and the non-project area may be calculated through the optical proximity correction.

In other embodiments of the inventive concept, a method of etch proximity correction includes setting a target position on a target pattern in a pattern region of a layout, setting a proximity region affecting the target position by the etch reaction when the target pattern is etch-patterned, calculating an etch bias value from surface integrals of a project area corresponding to an area blocked by the pattern region within a linear distance projected from the target position to an outermost portion of the proximity region and a non-project area corresponding to an area projected into an edge linear distance from an edge of the pattern region blocked in the linear distance to the outermost portion of the proximity region, and correcting the target position in the target pattern using the etch bias value. The method of etch proximity correction may be performed if it is determined that etch proximity correction with respect to all patterns within the layout is not completed In some embodiments, when the etch bias value has a positive value at the target position, the correcting of the target position includes moving the target position based on the etch bias value toward a center direction of the target pattern. In some embodiments, when the etch bias has a negative value at the target position, the correcting of the target position includes moving the target position based on the etch bias value toward an outside of the target pattern. In some embodiments, the etch bias value is affected by parameters including a type of plasma generation electrodes constituting an etcher, applied power and heights of the electrodes.

In some embodiments, the etch bias value of the project area is expressed as:

$$\iint_{project\ area} G(r) \times A(r,\theta) dr d\theta,$$

wherein G(r) is a first function depending on a distance variation of the radius r of the proximity region, and A(r, θ) is a second function depending on a variation of the radius r and azimuthal angle θ of the proximity region. In some embodiments, the G(r) includes a function having a bell shape in inverse proportion to the radius r centered at the target position. In some embodiments, the G(r) includes 1/r and exp(−r²). In some embodiments, the A(r, θ) includes a trigonometric function or exponential function or a constant. In some embodiments, the A(r, θ) includes 1, cos θ, sin θ, exp(−θ/b), or exp(−Er θ/b), wherein the Er is an ellipticity.

In some embodiments, the etch bias value of the non-project area is expressed as:

$$\iint_{non\text{-}project\ area} H(r_1) \times A(r_1, \theta_1) dr_1 d\theta_1$$

wherein $H(r_1)$ is a third function which varies according to an edge linear distance $r_1$ from an edge E1 of the pattern region to an outermost portion of the proximity region, and $A(r_1, \theta_1)$ is a fourth function depending on variations of the edge linear distance $r_1$ from the edge E1 to the outermost portion of the proximity region and an edge azimuthal angle $\theta_1$ at the edge E1. In some embodiments, the $H(r_1)$ is a constant around the edge E1 or in proportion or in inverse proportion to the edge linear distance $r_1$. In some embodiments, the $H(r_1)$ includes a function corresponding to each of 1, $r_1$, $1/r_1$, and $\exp(-r_1^2)$. In some embodiments, the A(r, θ) includes a trigonometric function or exponential function or a constant. In some embodiments, the $A(r_1, \theta_1)$ includes 1, cos $\theta_1$, sin $\theta_1$, $\exp(-\theta_1/b)$, or $\exp(-Er\ \theta_1/b)$.

The project area may be a half-circle beginning at one edge of the target pattern and ending at another edge of the target pattern, and extending to the outermost portion of the proximity region, and the non-project area may be defined by an arc extending from the edge of the target pattern and an arc extending from the other edge of the target pattern to the outermost portion of the proximity region. Also, the project area may extend toward the outermost portion of the proximity region and end at a neighboring pattern adjacent to the target pattern within the proximity region, and the non-project area may be defined by an arc extending from an end of project area to the outermost portion of the proximity region.

In other embodiments of the inventive concept, a method of creating a photomask including designing a target layout comprising a pattern region, performing etch proximity correction to create a measurement layout, and performing optical proximity correction to create the photomask, wherein the performing of the etch proximity correction includes setting a target position on a target pattern in a pattern region of a target layout, setting a proximity region affecting the target position by the etch reaction when the target pattern is etch-patterned, calculating an etch bias value based on a project area corresponding to an area radially extending from the target position toward an outermost portion of the proximity region and ending within the proximity region, and a non-project area corresponding to an area extending past an end of the project area to the outermost portion of the proximity region, and correcting the target position in the target pattern using the etch bias value.

BRIEF DESCRIPTION OF THE DRAWINGS

The accompanying drawings are included to provide a further understanding of the present general inventive concept, and are incorporated in and constitute a part of this specification. The drawings illustrate exemplary embodiments of the present general inventive concept and, together with the description, serve to explain principles of the present general inventive concept. These and/or other features, utilities and advantages of the present general inventive concept will become apparent and more readily appreciated from the following description of the embodiments, taken in conjunction with the accompanying drawings of which:

FIGS. 13A-3C illustrate an etch proximity correction unit and a photomask creator, as well as a photolithography process, according to an embodiment of the present general inventive concept.

DETAILED DESCRIPTION OF THE PREFERRED EMBODIMENTS

Figure 1:
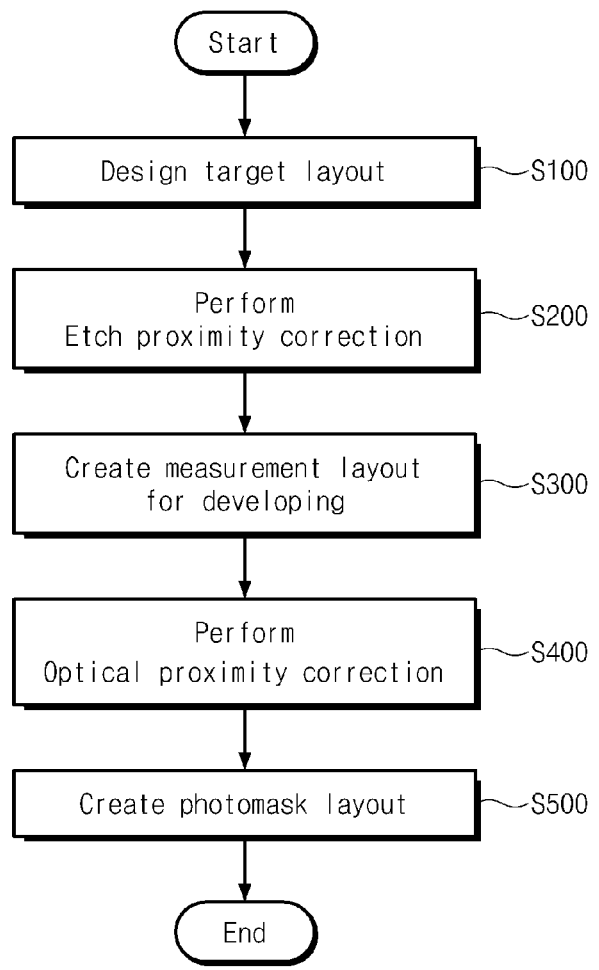
FIG. 1 is a flowchart illustrating a process of creating a photomask layout according to an embodiment of the present general inventive concept.

Exemplary embodiments of the inventive concept will be described below in more detail with reference to the accompanying drawings.

Reference will now be made in detail to the embodiments of the present general inventive concept, examples of which are illustrated in the accompanying drawings. The embodiments are described below in order to explain the present general inventive concept while referring to the figures.

The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the drawings, the dimensions of layers and regions may be exaggerated for clarity of illustration.

It will also be understood that when one element such as a region, a radius, or a distance is referred to as being "connected" or "coupled" to the other element, it can be directly "connected" or "coupled" to the other elements or one or more intervening elements may also be present. On the other hand, it will also be understood that when one element is referred to as being directly "connected" or coupled" to the other element, intervening elements may not also be present. Like reference numerals refer to like elements throughout. The word 'and/or' means that one or more or a combination of relevant constituent elements is possible.

Also, though terms like "first" and "second" are used to describe various members, components, regions, layers, and/or portions in various embodiments of the inventive concept, the members, components, regions, layers, and/or portions are not limited to these terms. These terms are used only to differentiate one member, component, region, layer, or portion from another one. Therefore, a member, a component, a region, a layer, or a portion referred to as a first member, a first component, a first region, a first layer, or a first portion in an embodiment can be referred to as a second member, a second component, a second region, a second layer, or a second portion in another embodiment.

Relative terms, such as "neighboring" or "adjacent" may be used herein to describe one element's relationship to another element as illustrated in the Figures. It will be understood that relative terms are intended to encompass different orientations of the device in addition to the orientation depicted in the Figures. For example, if the device in the Figures is oriented (rotated at an angle of about 90 degrees with respect to the other direction) in the other direction, the relative descriptions used in the present specification may be construed as depending on these descriptions.

In the following description, the technical terms may be used only to explain a specific exemplary embodiment while not limiting the inventive concept. The terms of a singular form may include plural forms unless referred to the contrary. The meaning of "include," "comprise," "including," or "comprising," specifies configurations, figures, steps, members, elements and/or groups thereof but does not exclude other configurations, figures, steps, members, elements and/or groups thereof.

Additionally, the embodiment in the detailed description will be described with reference to ideal exemplary drawings of the inventive concept. For example, in drawings, shapes of the exemplary drawings may be modified according to manufacturing techniques and/or tolerances. Therefore, the embodiments of the inventive concept are not limited to the specific shape illustrated in the exemplary views, but may include other shapes that may be created according to manufacturing processes.

Figure 2:
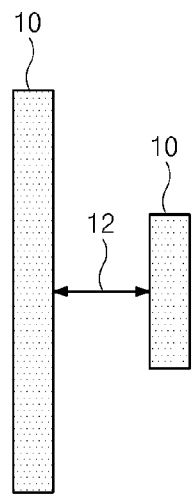
FIG. 2 is a plan view of patterns on a target layout.
Figure 3:
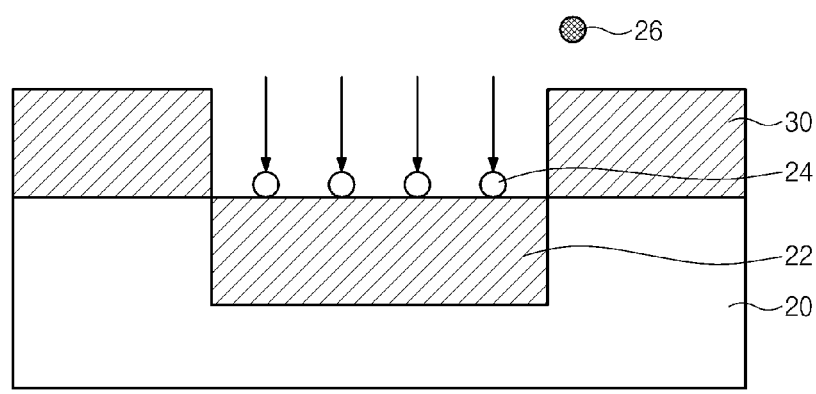
FIGS. 3 and 4 are sectional views illustrating photoresist patterns on a wafer and generation and re-deposition of an etch polymer.
Figure 4:
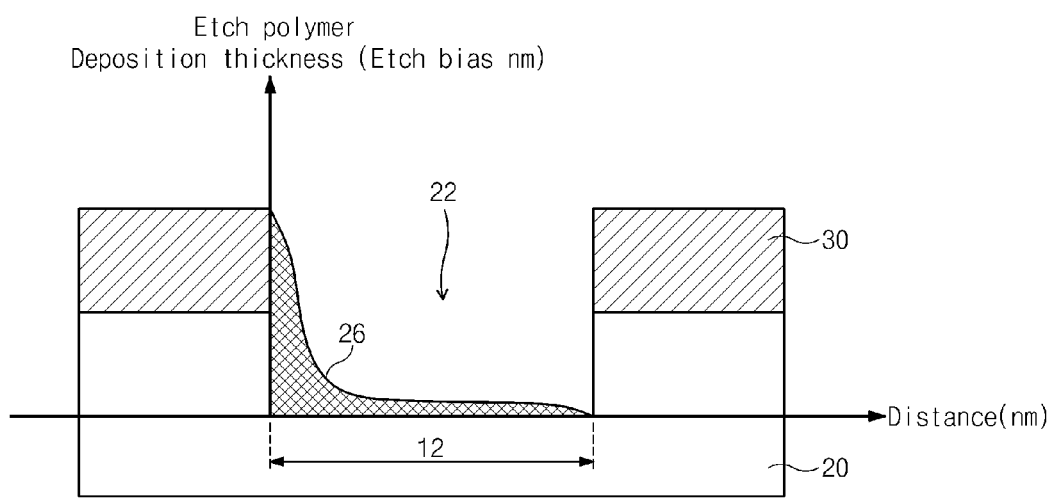

FIG. 1 is a flowchart illustrating a process of creating a photomask layout according to an embodiment of the present general inventive concept, and FIG. 2 is a plan view of patterns on a target layout. FIGS. 3 and 4 are sectional views illustrating photoresist patterns on a wafer and generation and re-deposition of an etch polymer.

Referring to FIGS. 1 to 4, a method of forming a photomask layout according to an embodiment of the present general inventive concept may include designing a target layout to be formed on a surface of a wafer (S100), performing etch proximity correction (S200) to develop the target layout, thereby creating a measurement layout for developing a photomask (S300), and performing optical proximity correction on the measurement layout (S400) after developing the target layout, which results in creating of a photomask layout (S500). The target layout may include a pattern region having line-shaped patterns 10. The patterns 10 may have a space therebetween and be randomly placed. The target layout may be different from the photomask layout according to positions and shapes of the patterns 10. Here, the prefix target may include a resultant product, which is intended to be finally realized by a user.

The patterns 10 may be formed on a wafer 20 through a photolithography process including an exposure process of a photoresist and an etch process of a photoresist pattern 30 formed through a measuring process after developing the photoresist pattern 30. The measuring process may be performed by measuring the photoresist pattern 30 by a microscope before the etch process via the photolithography process. Thus, the measuring process may ensure that the photoresist pattern 30 overlap with the patterns 10. The patterns 10 in the target layout to be formed on the wafer 20 may be different in shape and position from the patterns 10 in the photomask layout to be formed on a photomask. The differences in shape between the photomask patterns 10 and the pattern formed on the wafer may be the result of sizes and densities of the shapes, and the distances between shapes of the patterns 10.

The target layout may be easily designed in shape and position of line- or polygonal-shaped patterns to be formed on the surface of the wafer 20 by the user. The photomask layout may include deformed patterns, which are previously predicted in consideration of process parameters of the exposure and etch processes, to form the patterns 10. Thus, it may be difficult to define the photomask layout because it may vary in shape according to the process parameters.

The photomask layout may be created by reversely performing the photolithography process. As described above, the photolithography process may include the exposure process, the measuring process after developing the photoresist pattern, and the etch process, which are successively performed. On the other hand, the photomask layout may be created through the optical proximity correction after the measurement layout is created from the target layout after developing the target layout, where the target layout is formed on the wafer 20 through the etch proximity correction. The target layout may be a final result in the photolithography process, and may be finally formed on the wafer 20 at the end of the photolithography process. The measurement layout after developing the target layout may be created through the etch proximity correction of the target layout. Then, the photomask layout may be created through the optical proximity correction of the measurement layout after developing the target layout.

Thus, the method of creating the photomask layout according to an embodiment of the present general inventive concept may include the etch proximity correction and the optical proximity correction, which are performed on the target layout defined by the user in reverse order of the photolithography process.

The optical proximity correction may be formulated according to wavelengths and lighting conditions of a light source for exposing the photoresist on the wafer to the light and weighting factors corresponding to aspherical aberration conditions of a lens in an exposure tool. The etch proximity correction may be formulated according to a plasma power of an etcher and conditions such as a type and a height of an electrode. Since the etch proximity correction and the optical proximity correction are changed in only weighting factors according to characteristics and limitations of a manufacturing apparatus, creation of the target layout and the layout after developing the target layout may be performed in methods similar to each other, respectively.

Thus, the etch proximity correction method according to an embodiment of the present general inventive concept will be described in detail. An occurrence of a difference of a critical dimension (CD) due to a micro-loading effect with respect to individual patterns substantially has specific trends different from each other according to etching methods using plasma, wherein the CD is a minimum line width. The micro-loading effect may take place with neighboring patterns. For example, there may be a mismatch between mask patterns of the photoresist and the etched patterns according to existence of the neighboring patterns. Further, the CD of a single line pattern may be relatively wider than that of multiple line patterns in the proximity region S. The etch bias value substantially depends on characteristics and a thickness of a material layer physically etched by etchant gas. Also, parameters affecting the etch bias value may include a type of plasma generation electrodes constituting the etcher, applied power, and heights of the electrodes. It may be difficult to substantially secure an etch bias model completely reflecting the parameters depending on characteristics of the etcher and the parameters depending on the material characteristics due to limitations of simulation time and software. Furthermore, since the etch proximity correction requires quick and accurate simulation and layout correction, it is difficult to secure a model reflecting all parameters. In an embodiment of the present general inventive concept, phenomenologically matched factors are extracted, and then the matched factors are applied to the modeling. In an embodiment of the present general inventive concept, it is considered that an etch bias has an influence on a distribution amount of a polymer due to a distance between the patterns adjacent to each other and a re-deposited amount of the polymer.

The wafer 20 exposed by the photoresist pattern 30 disposed on the wafer 20, or a thin film on the wafer 20, may be etched by etch gas ions 24 having a plasma state to generate an etch polymer 26 as a by-product. The etch polymer 26 may be re-deposited on the wafer 20 or the thin film exposed by the photoresist pattern 30. The re-deposition of the etch polymer may be determined according to an in-plane size of the photoresist pattern 30 or the wafer pattern 22. For example, a re-deposited thickness of the etch polymer 26 may be in proportion to the in-plane size of the wafer pattern 22 exposed by the photoresist pattern 30. In addition, the etch polymer 26 may be adjusted according to the etch bias value. Similarly, when the etch bias value is increased, a large amount of the etch polymer 26 may be also generated. Thus, the etch bias value may be linearly increased in proportion to the in-plane size of the wafer pattern 22 exposed by the photoresist pattern 30. Also, a critical dimension difference between the target pattern to be formed and the wafer pattern 22 may be in proportion to sizes and distances of left and right spaces of the wafer pattern 22. That is, considering configurations of the patterns 10, an etch bias value may be also increased in proportion to the size or distance of the respective spaces 12. The etch bias value may be calculated by a nanometer unit corresponding to a distance.

When considering the etch process in which a large amount of the etch polymer 26 is generated, the etch polymer 26 is re-deposited around the wafer pattern 22. The re-deposition of the etch polymer 26 may restrict the etch bias. As described above, the distribution of the etch polymer 26 affecting the etch bias depends on an inverse function of the distance or a Gaussian distribution function. The etch proximity correction method using the etch bias will be described below.

Figure 5:
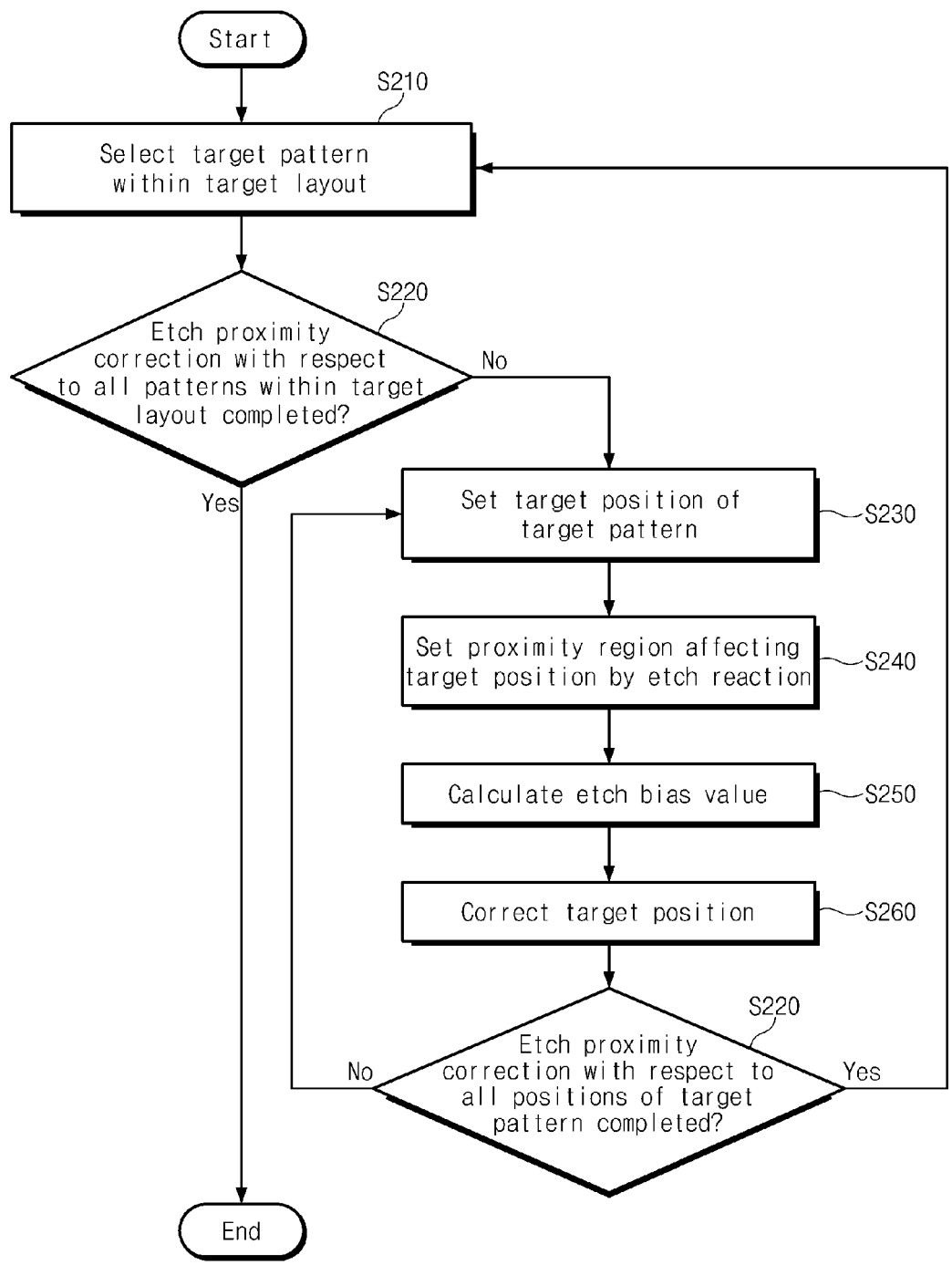
FIG. 5 is a flowchart illustrating a process of etch proximity correction of FIG. 1.
Figure 6:
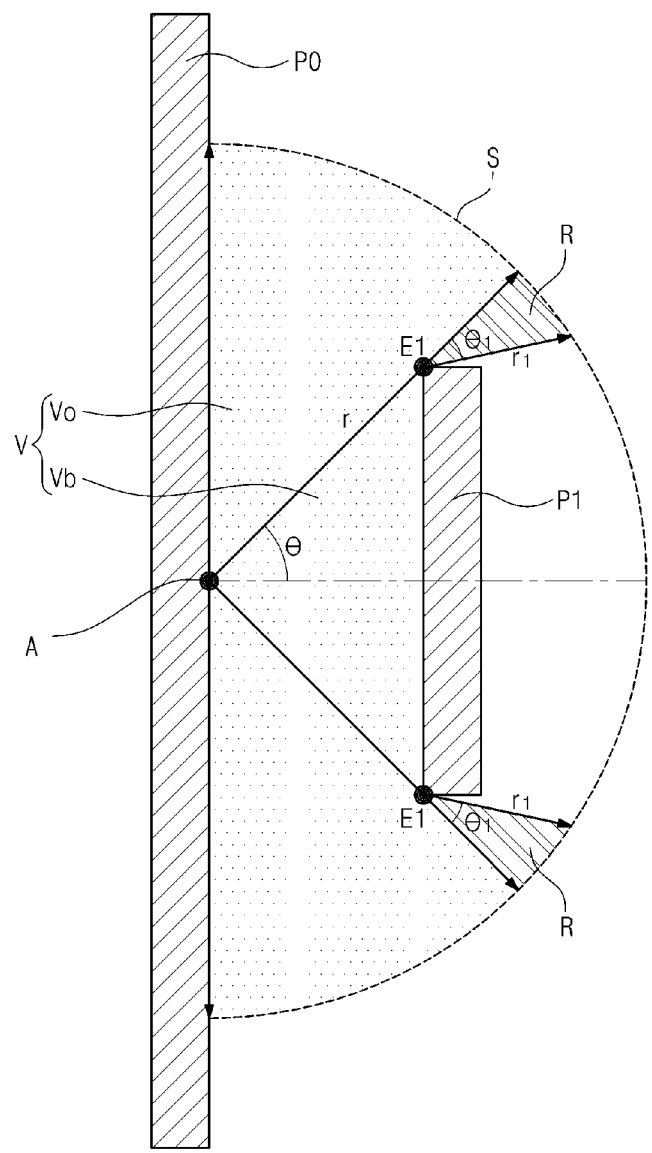
FIG. 6 is a plan view of a target pattern, a target position, and a visible area.

FIG. 5 is a flowchart illustrating a process of etch proximity correction of FIG. 1. FIG. 6 is a plan view of a target pattern, a target position, and a visible area.

Referring to FIGS. 5 and 6, in an etch proximity correction method according to an embodiment of the present general inventive concept, a target pattern P0 is selected in a target layout in operation S210. The target layout may include, for example, a plurality of patterns having a circular shape, a triangular shape, a square shape, or a polygonal shape. The target pattern P0 may be successively selected after the etch proximity correction is separately performed on the plurality of patterns within the target layout. Thus, when the etch proximity correction is performed on all of the patterns within the target layout in operation S220, the target layout may be generated as a measurement layout after developing.

If the etch proximity correction is not completely performed on all of the patterns within the target layout in operation S220, a target position A is set on the selected corresponding target pattern P0 in operation S230. The target position A may be selected on the outer surface of the target pattern P0. The etch proximity correction may be successively performed after the target position A is separately selected on the entire target pattern P0.

Next, a proximity region S, which affects the target position A by an etch reaction when the target pattern P0 is etch-patterned is set in operation S240. The proximity region S may be expressed as a polar coordinate system including a radius r corresponding to a linear distance from the target position A to a distance affected by the etch reaction and an azimuthal angle θ corresponding to a circumference of the target position A. Hereinafter, the radius r of the proximity region S and the linear distance r may have the same symbol as each other. The radius r of the proximity region S may be experimentally set by a user or an interface.

Thereafter, an etch bias value at the target position A is calculated in operation S250. The etch bias value may include digitized areas of a pattern region and bare regions within the proximity region S of the target position A. The etch bias value may correspond to an etch bias applied to the target position A due to the etch reaction during the etch process of the target pattern P0. When the etch bias value is increased, the target position A may be moved from the outer surface of the target pattern P0 toward a center direction. In addition, when the etch bias value is decreased, the target position A may be moved from a center of the target pattern P0 toward the outside. For example, when the etch bias value has a positive value at the target position A, the target position A may be moved by a position corresponding to the etch bias value toward the center direction of the target pattern P0. Also, when the etch bias has a negative value at the target position A, the target position A may be moved by a position corresponding to the etch bias value toward the outside of the target pattern P0.

The etch bias value may be predicted from an etch bias model defined as the sum of a visible area, a blocked area, and a pattern density. The blocked area may correspond to an area occupied by the pattern region within the proximity region S. The pattern density may correspond to a ratio of the pattern region to the proximity region S. The visible area may be calculated by the linear distance r from the target position A to the outermost portion of the proximity region S and a visible kennel function in which the linear distance uses a rotation azimuthal angle θ as a variable. The visible area may include a project area V corresponding to an area, which is blocked by the pattern region and a non-project area R corresponding to an area in which light takes a detour around the portion blocked by the pattern region and thus is projected up to the outside of the proximity region S in a linear distance projected from the target position A up to the outside of the proximity region S. Here, the pattern region may include neighboring patterns including a first neighboring pattern P1 and a second neighboring pattern and a target pattern P0.

The projected area V may include an open project area Vo corresponding to an area, which is not blocked by the pattern region up to the outermost portion of the proximity region S and a block project area Vb, which is blocked by the pattern region. Thus, the block project area Vb may include an area from the target position A to the first neighboring pattern P1 adjacent to the target pattern P0 in the linear distance r projected from the target position A. The open project area Vo may include an arc area calculated from a radius and azimuthal angle of the proximity region S, as illustrated in FIG. 6. The block project area Vb may include a triangular area calculated from a linear distance r connected from the target position A to an edge of the first neighboring pattern P1 and a trigonometric function of the azimuthal angle θ, as illustrated in FIG. 6.

As described above, the etch bias value may be increased in proportion to the inverse function of the distance from the target position A or the Gaussian distribution function. The etch bias value of the project area V may be expressed as Equation (1).

$$\iint_{project\ area} G(r) \times A(r, \theta) dr d\theta \quad (1)$$

$G(r)$ is a first function depending on a distance variation of the radius r of the proximity region S, and $A(r, \theta)$ is a second function depending on a variation of the radius r and azimuthal angle θ of the proximity region S. The $G(r)$ may include a function having a bell shape in inverse proportion to the radius r centered at the target position A. For example, the $G(r)$ may include $1/r$ and $\exp(-r^2)$. The $A(r, \theta)$ may include a trigonometric function or exponential function, which is constantly or regularly varied at a circumference of the target position A, or a constant. For example, the $A(r, \theta)$ may include 1, $\cos \theta$, $\sin \theta$, $\exp(-\theta/b)$, or $\exp(-Er\ \theta/b)$. The Er is an ellipticity. Thus, an etch bias value of the project area may include a surface integral of the project area, which multiplies the first function $G(r)$ depending on the distance variation of the radius r by the second function $A(r, \theta)$ depending on the radius r and azimuthal angle θ. In the first function $G(r)$ and the second function $A(r, \theta)$, constants may be multiplied as weighting factors.

The non-project area R may include a bent area calculated from an edge linear distance $r_1$ from the target pattern P0 or a first edge E1 of the first neighboring pattern P1 to the outermost portion of the proximity region S and an edge azimuthal angle $\theta_1$. The first edge E1 of the first neighboring pattern P1 blocked in the linear distance r from the target position A to the outermost portion of the proximity region S or the first neighboring pattern P1 may correspond to the bent position. The etch bias value of the non-project area R may be expressed as Equation (2).

$$\iint_{non-project\ area} H(r_1) \times A(r_1, \theta_1) dr_1 d\theta_1 \quad (2)$$

$H(r_1)$ is a third function, which varies according to an edge linear distance $r_1$ from the first edge E1 to the outermost portion of the proximity region S, and $A(r_1, \theta_1)$ is a fourth function depending on variations of the first edge linear distance $r_1$ from the first edge E1 to the outermost portion of the proximity region S and an edge azimuthal angle $\theta_1$ at the first edge E1. Also, the first edge linear distance $r_1$ may be changed according to the edge azimuthal angle $\theta_1$. The first edge linear distance $r_1$ and an edge radius $r_1$ may have the same reference symbol as each other. The $H(r_1)$ may be constant around the first edge E1 or in proportion or in inverse proportion to the first edge linear distance $r_1$. For example, the $H(r_1)$ may include a function corresponding to each of 1, $r_1$, $1/r_1$, and $\exp(-r_1^2)$. The $A(r_1, \theta_1)$ may include a trigonometric function or an exponential function, which is constant or regularly varied at the circumference of the target position A, or a constant. For example, the $A(r_1, \theta_1)$ may include 1, $\cos \theta_1$, $\sin \theta_1$, $\exp(-\theta_1/b)$, or $\exp(-Er\ \theta_1/b)$. An etch bias value of the non-project area may include a surface integral of the non-project area, which multiplies the third function $H(r_1)$ depending on the edge linear distance $r_1$ by the fourth function $A(r_1, \theta_1)$ depending on the first edge linear distance $r_1$ and the edge azimuthal angle $\theta_1$. In the third and fourth functions, constants may be multiplied as weighting factors.

Thus, in the etch proximity correction method according to an embodiment of the present general inventive concept, the etch bias value may be calculated from the etch bias model defined as the visible area including the project area V and the non-project area R. According to the etch bias model, the etch bias calculated from surface integrals of the project area V and the non-project area R, which involves multiplying distance dependence functions depending on variations of the distance from the target position A to the outermost portion of the proximity region S and the azimuthal angle by functions depending on the distance and azimuthal angle, may be predictable. Also, the etch bias model may predict a difference of local etch bias values according to a variation of a global etch bias value involved during the etch process.

Figure 7A:
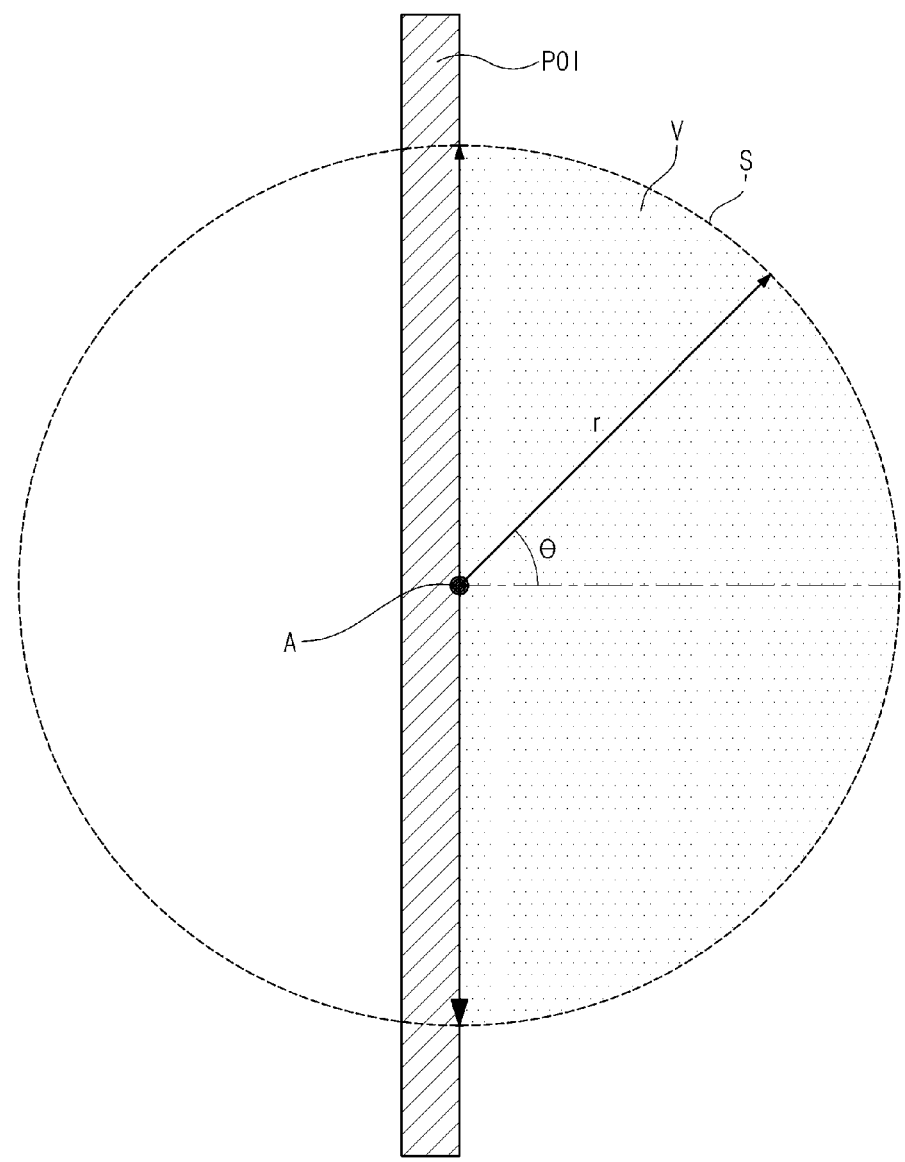
FIGS. 7A and 7B are plan views for comparing etch bias values equally calculated using only a project area in target patterns having lengths different from each other.
Figure 7B:
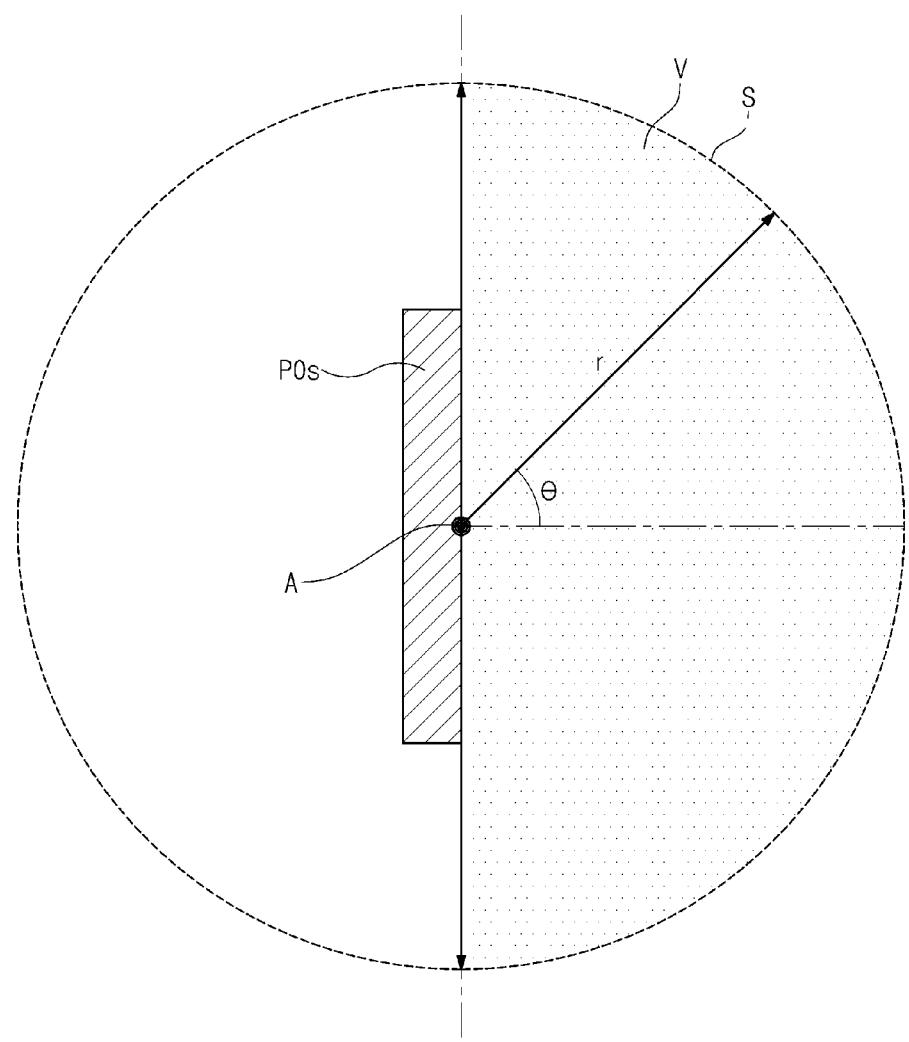
Figure 8:
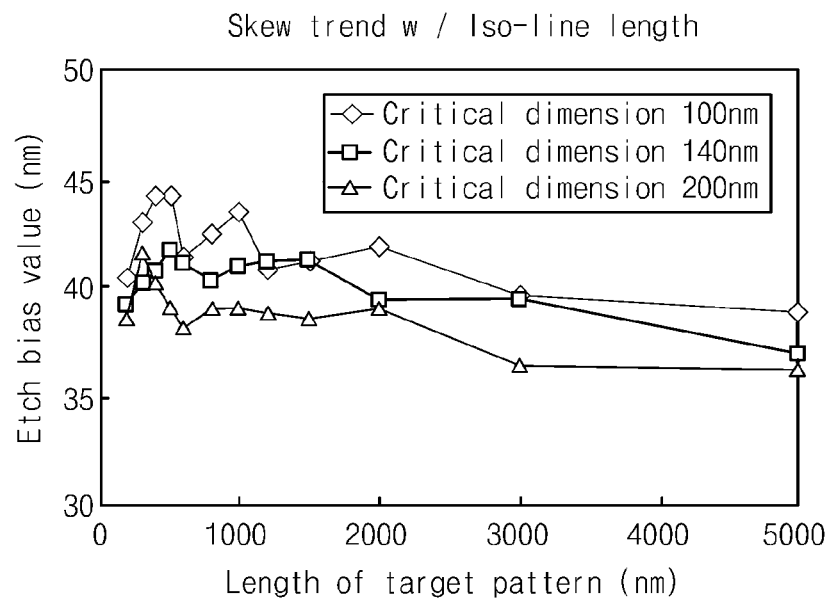
FIG. 8 is graphs illustrating results of measuring an etch bias according to a length of a target pattern formed into an independent line.
Figure 9:
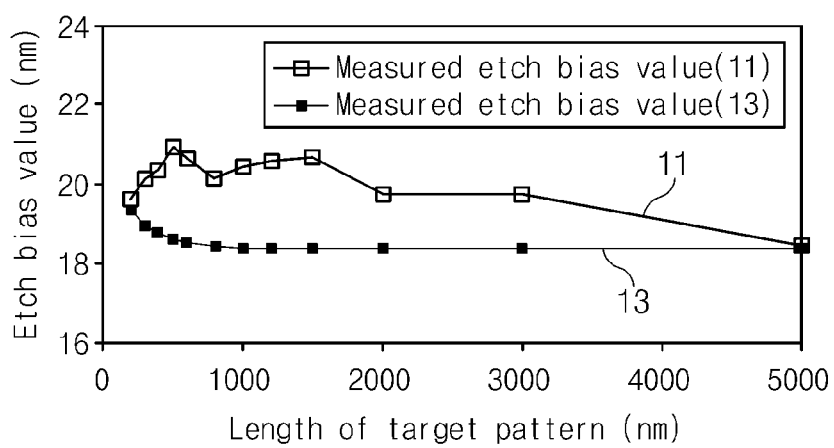
FIG. 9 is a graph for comparing an etch bias value measured according to a length of a target pattern formed into an independent line and an etch bias value calculated using only a project area.

FIGS. 7A and 7B are plan views for comparing etch bias values equally calculated using only a project area (thus without using a non-project area) in target patterns having lengths different from each other. FIG. 8 is a graph illustrating results of measuring an etch bias according to a length of a target pattern formed into an independent line. FIG. 9 is a graph for comparing an etch bias value measured according to a length of a target pattern formed into an independent line and an etch bias value calculated using only a project area.

Referring to FIGS. 7A and 7B, a long line target pattern P01 having a length greater than a radius of a proximity region S and a short line target pattern P0s having a length less than the radius of the proximity region S may have the same project area as each other. Thus, the long line target pattern P01 and the short line target pattern P0s may have the same etch bias value as each other at each target position A thereof. However, as a target pattern P0 having an independent line shape is changed in length, an etch bias value is differently measured as shown in FIGS. 8 and 9.

Referring to FIG. 8, as a length of the target pattern formed into the independent line becomes longer, the etch bias value is reduced. When the target pattern formed into the independent line has a short length of less than about 2,000 nm, the etch bias value fluctuates without a constant regularity. Furthermore, as a critical dimension of the target pattern formed into the independent line is gradually increased, the etch bias value further irregularly fluctuates. A target pattern having an independent line having a critical dimension of about 100 nm at a length of less than about 2,000 nm has an etch bias value of about 40 nm to about 45 nm. On the other hand, a target pattern having an independent line having a length of less than about 2,000 nm and a critical dimension of about 200 nm has an etch bias value of about 38 nm to about 41 nm.

Thus, in the etch proximity correction method according to an embodiment of the present general inventive concept, since the target pattern of the independent line has irregularly fluctuating etch bias values, especially for the independent line having a length less than about 2,000 nm, an etch bias model may not be generated using only the project area V. Rather, the etch bias model is preferred to be generated using both the project area V and the non-project area R.

Referring to FIG. 9, an etch bias value 13 calculated using only the project area V is significantly different from an etch bias value 11 when the target pattern having the independent line has a short length. When the etch bias value 13 calculated using only the project area V is gradually decreased within a range between about 20 nm and about 18 nm when the target pattern P0 having the independent line has a length of less than about 1,000 nm. On the other hand, the measured etch bias value 11 fluctuates between about 19 nm to about 21 nm until the target pattern P0 having the independent line has a length of less than about 2,000 nm. Thus, the etch bias value at the target position A of the target pattern P0 may be more accurately calculated when the non-project area R as well as the project area V is applied.

Figure 10A:
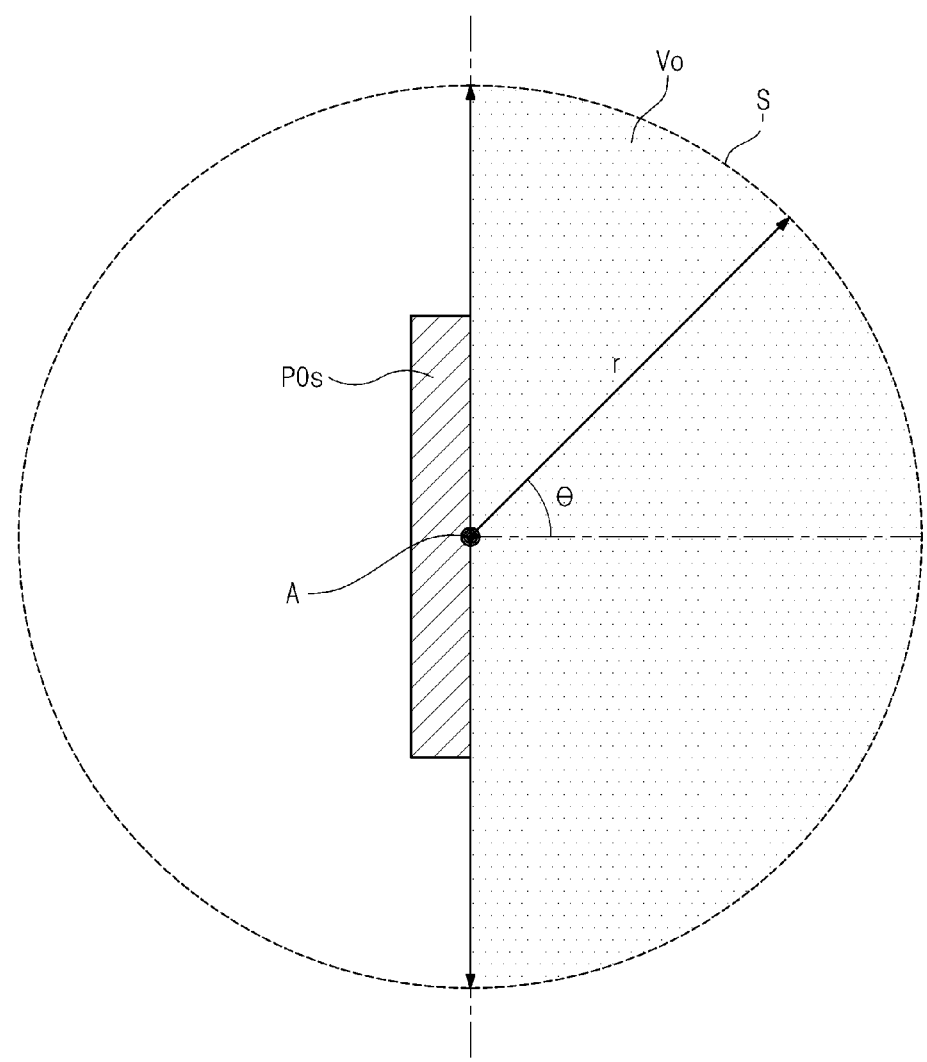
FIGS. 10A to 10C are plan views of a project area and a non-project area with respect to an independent short line target pattern having a length less than a radius of a proximity region.
Figure 10B:
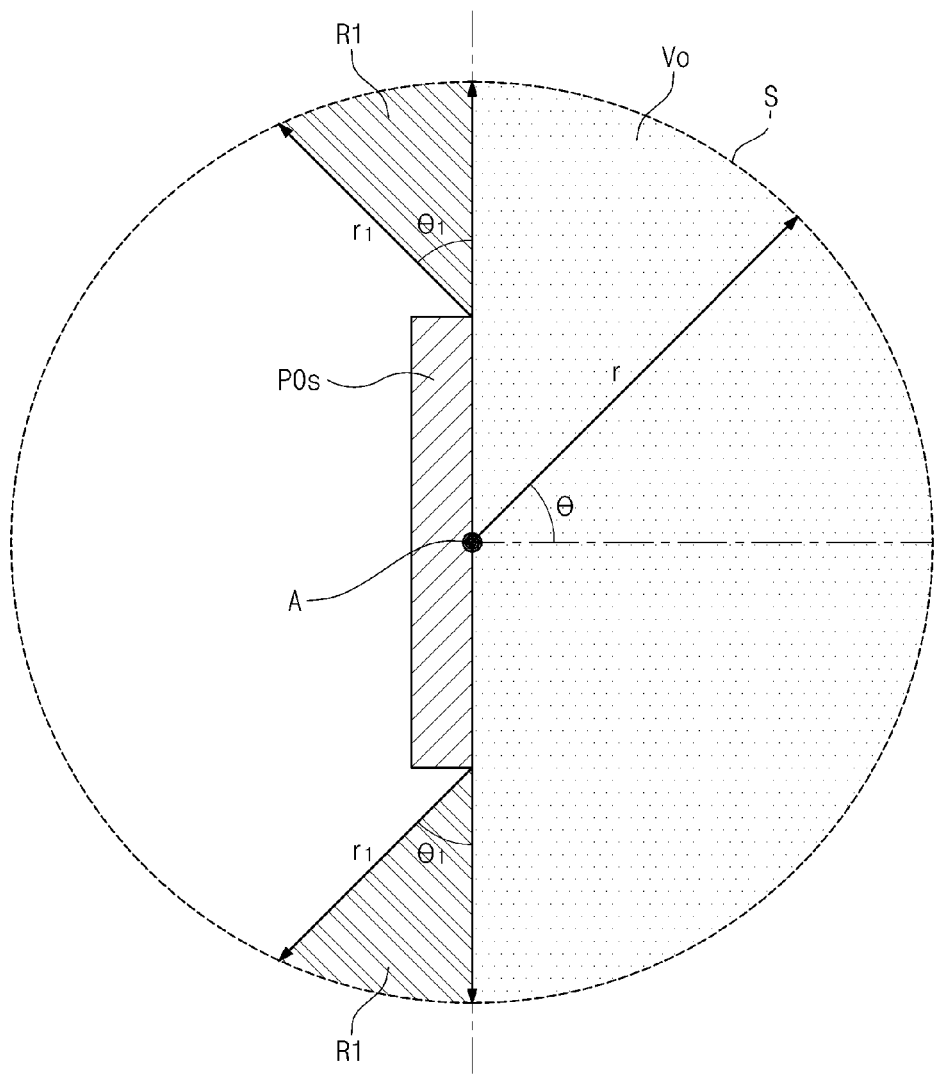
Figure 10C:
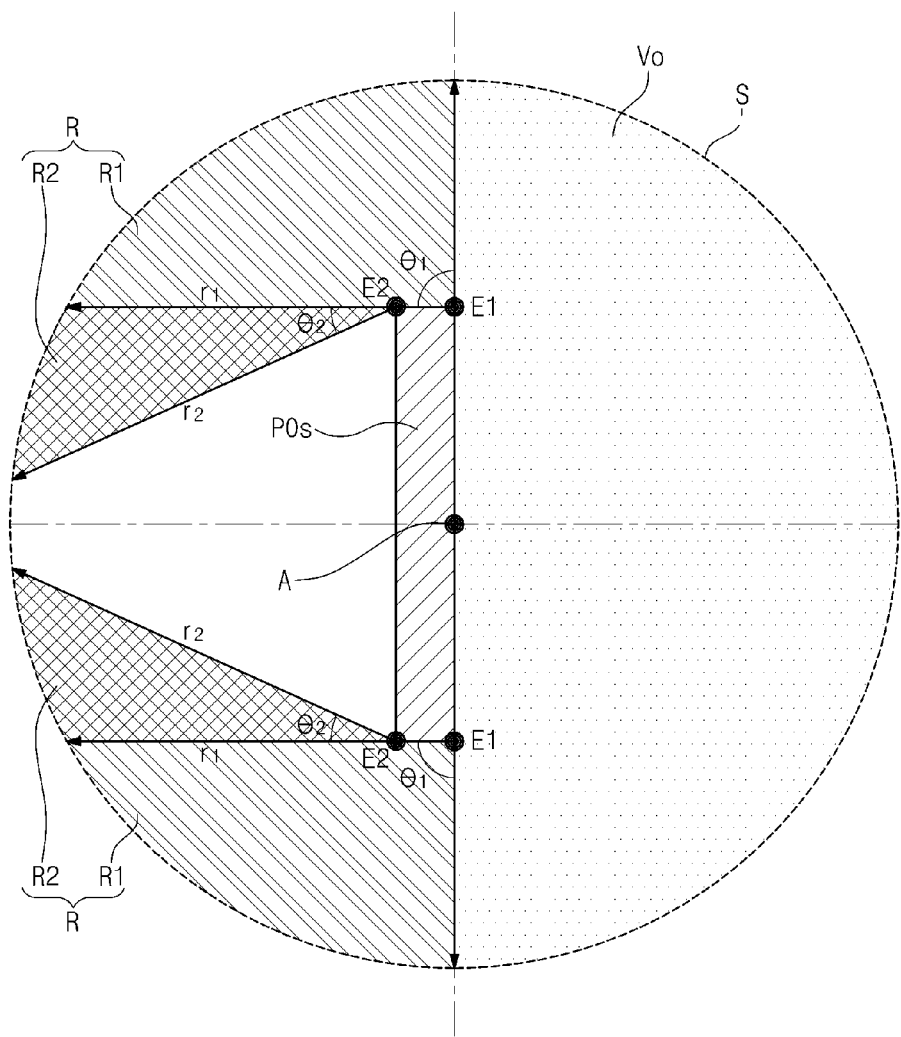

FIGS. 10A to 10C are plan views of a project area V and a non-project area R with respect to an independent short line target pattern having a length less than a radius of a proximity region.

Referring to FIGS. 10A to 10C, a visible area of an independent short line target pattern P0s having a length less than a radius of a proximity region S may include a project area V opened from a target position A, a first non-project area R1 bent at first edges E1 of the independent short line pattern P0s, and a second non-project area R2 bent at second edges E2 of the independent short line pattern P0s. Here, the first edges E1 and the second edges E2 may include edges of the independent short line pattern P0s.

The project area V may be calculated from a radius r and azimuthal angle θ of the proximity region S. The first non-project area R1 may be calculated from a first edge radius $r_1$ from each of the first edges E1 to the outermost portion of the proximity region S and a first edge azimuthal angle $θ_1$. The first edges E1 may be disposed between the target position A and the outermost portion of the proximity region S. The first non-project area R1 may continue from the project area V in a first edge azimuthal angle $θ_1$ direction. The first edge radius $r_1$ may be less than the radius r of the proximity region S. The first edge radius $r_1$ may be changed together with the first edge azimuthal angle $θ_1$ every time the first edge azimuthal angle $θ_1$ is changed. The first edge azimuthal angle $θ_1$ may start from an ended position of the project area V and may end at a position in which the first edge radius $r_1$ meets with the second edges E2.

The second edges E2 may be disposed between the first edges E1 and the outermost portion of the proximity region S. A second edge radius $r_2$ may be less than the radius r of the proximity region S. The second edge radius $r_2$ may be less or greater than the first edge radius $r_1$. The second edge azimuthal angle $θ_2$ may start from an ended position of the first non-project area R1 and may end at a position in which the second edge radius $r_2$ with respect to the second edge E2 meets with the other second edge E2. For example, the second edge azimuthal angle $θ_2$ with respect to the top second edge E2 may start from an ended position of the top first non-project area R1 and may end at a position in which the second edge radius $r_2$ with respect to the top second edge E2 meets with the bottom second edge E2. The second non-project area R2 may be continuously disposed from the first non-project area R1 in a first edge azimuthal angle $θ_1$ direction.

Figure 11A:
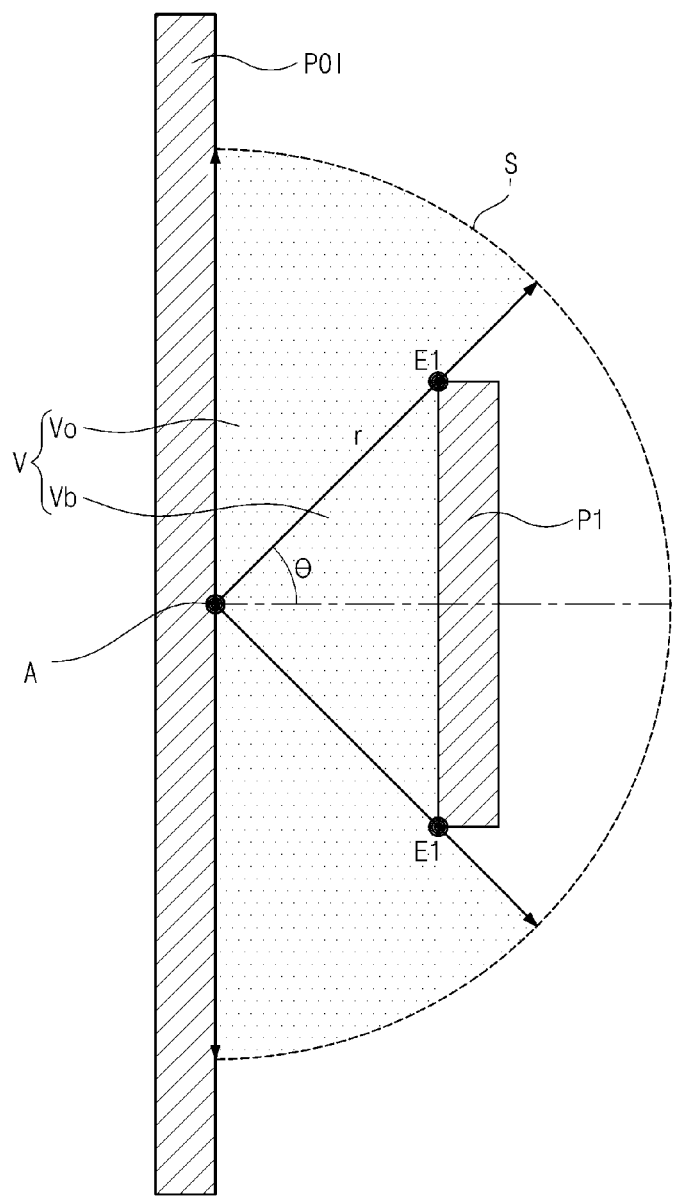
FIGS. 11A to 11C are plan views of a project area and a non-project area of a long line target pattern blocked by a first out pattern.
Figure 11B:
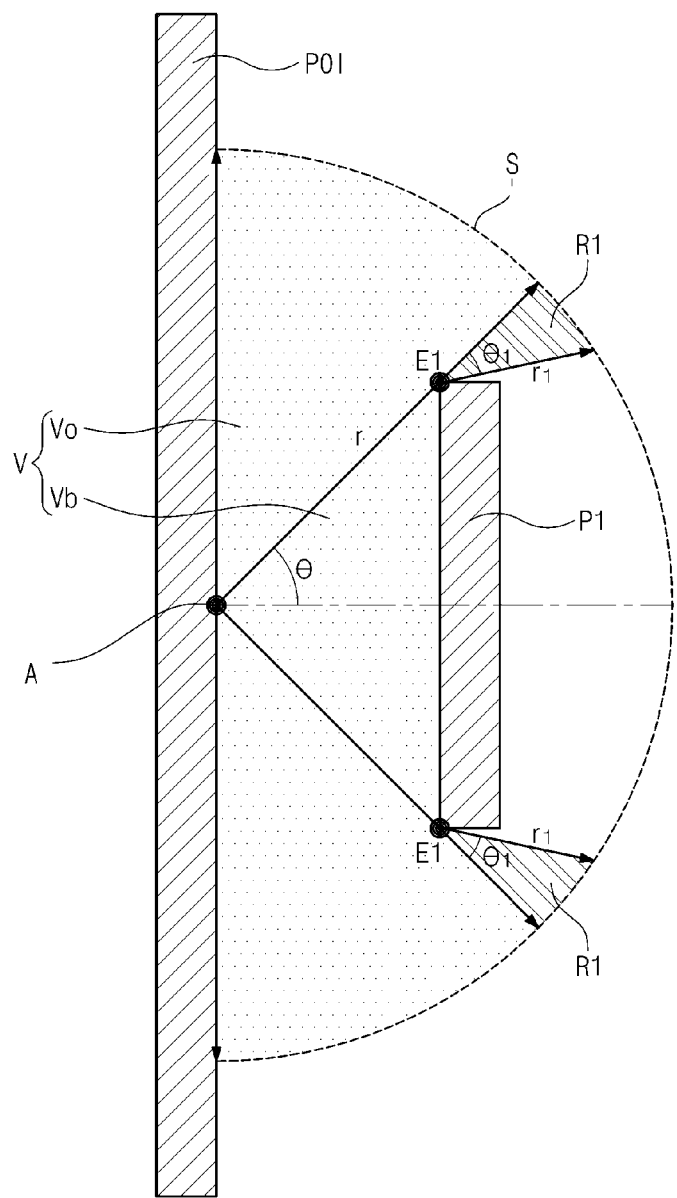
Figure 11C:
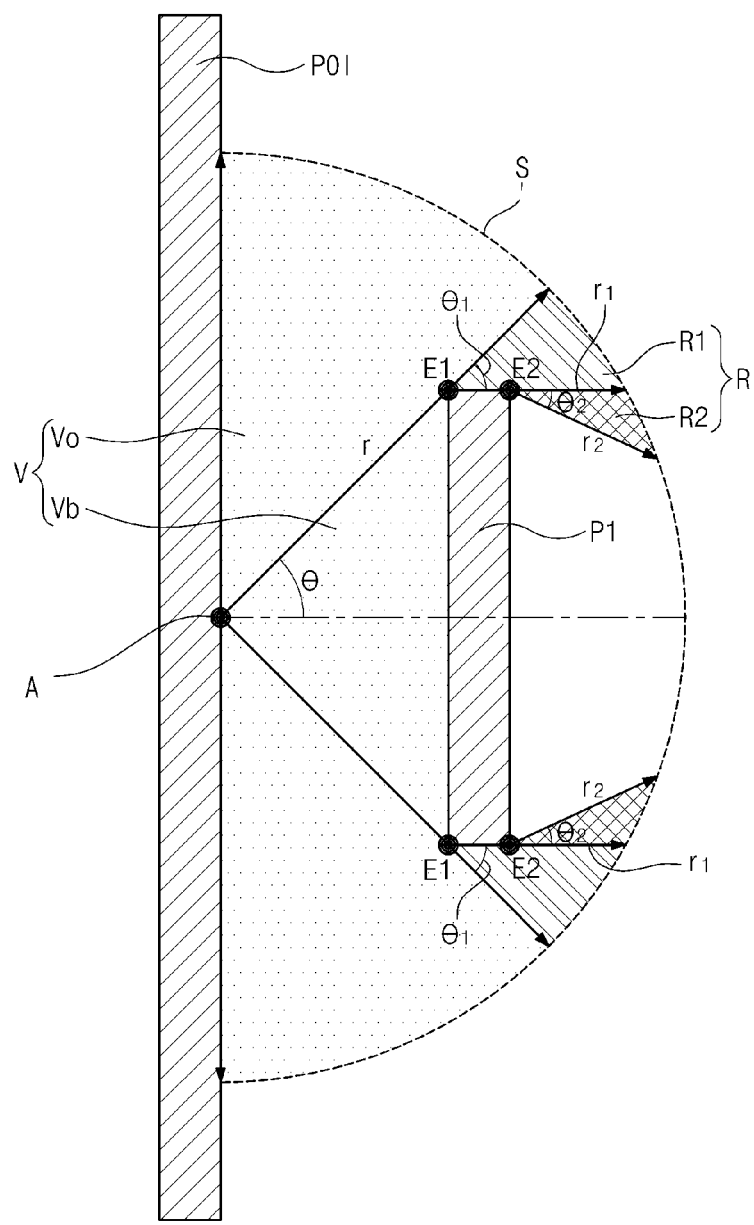

FIGS. 11A to 11C are plan views of a project area and a non-project area of a long line target pattern blocked by a first out pattern.

Referring to FIGS. 11A to 11C, a visible area of a long line target pattern P01 may include a project area V blocked by a first neighboring pattern P1 at a target position A, a first non-project area R1 bent at first edges E1 of the first neighboring pattern P1, and a second non-project area R2 bent at second edges E2 of the first neighboring pattern P1. Here, the first edges E1 and the second edges E2 may include edges of the first neighboring pattern P1 existing within a proximity region S from the target position A.

The project area V may be calculated from a radius r and an azimuthal angle θ within the long line target pattern P01, which is longer than a radius of the proximity region S. For example, the project area V from the target position A to the first edges E1 of the first neighboring pattern P1 in the long line target pattern P01 may include an open project area Vo corresponding to an arc area calculated from a radius r and azimuthal angle θ of the proximity region S. Also, the project area V blocked by the first neighboring pattern P1 at the target position A may include a block project area Vb corresponding to a triangular area calculated from a linear distance r from the target position A to the first edges E1 and a trigonometric function of an azimuthal angle θ.

The first non-project area R1 may be calculated from a first edge radius $r_1$ and a first edge azimuthal angle $θ_1$ from the first edges E1 to the outermost portion of the proximity region S. The first edges E1 may be disposed between the target position A and the outermost portion of the proximity region S. The first non-project area R1 may be continuously disposed from the project area V in an azimuthal angle θ direction. The first edge radius $r_1$ may be less than the radius r of the proximity region S. Also, the first edge radius $r_1$ may be changed together with the first edge azimuthal angle $θ_1$ every time the first edge azimuthal angle $θ_1$ is changed. The first edge azimuthal angle $θ_1$ may start from an ended position of the project area V and may end at a position in which the first edge radius $r_1$ meets with the second edges E2.

The second edges E2 may be disposed between the first edges E1 and the outermost portion of the proximity region S. A second edge radius $r_2$ may be less than the radius r of the proximity region S. The second edge radius $r_2$ may be less or greater than the first edge radius $r_1$. The first edge azimuthal angle $θ_1$ may start from an ended position of the first non-project area R1 and may be ended at a position in which the second edge radius $r_2$ with respect to the second edge E2 meets with the other second edge E2. For example, the second edge azimuthal angle $θ_2$ with respect to the top second edge E2 may start from an ended position of the top first non-project area R1 and may end at a position in which the second edge radius $r_2$ with respect to the top second edge E2 meets with the bottom second edge E2. The second non-project area R2 may be continuously disposed from the first non-project area R1 in a first edge azimuthal angle $θ_1$ direction.

Although not shown, when the line target pattern has a length less than the radius r of the proximity region S, the first non-project area R1 and the second non-project area R2 may be calculated at the first edges E1 and the second edges E2 of the first neighboring pattern P1 as well as the first edges E1 and the second edges E2 of the line target pattern.

Figure 12A:
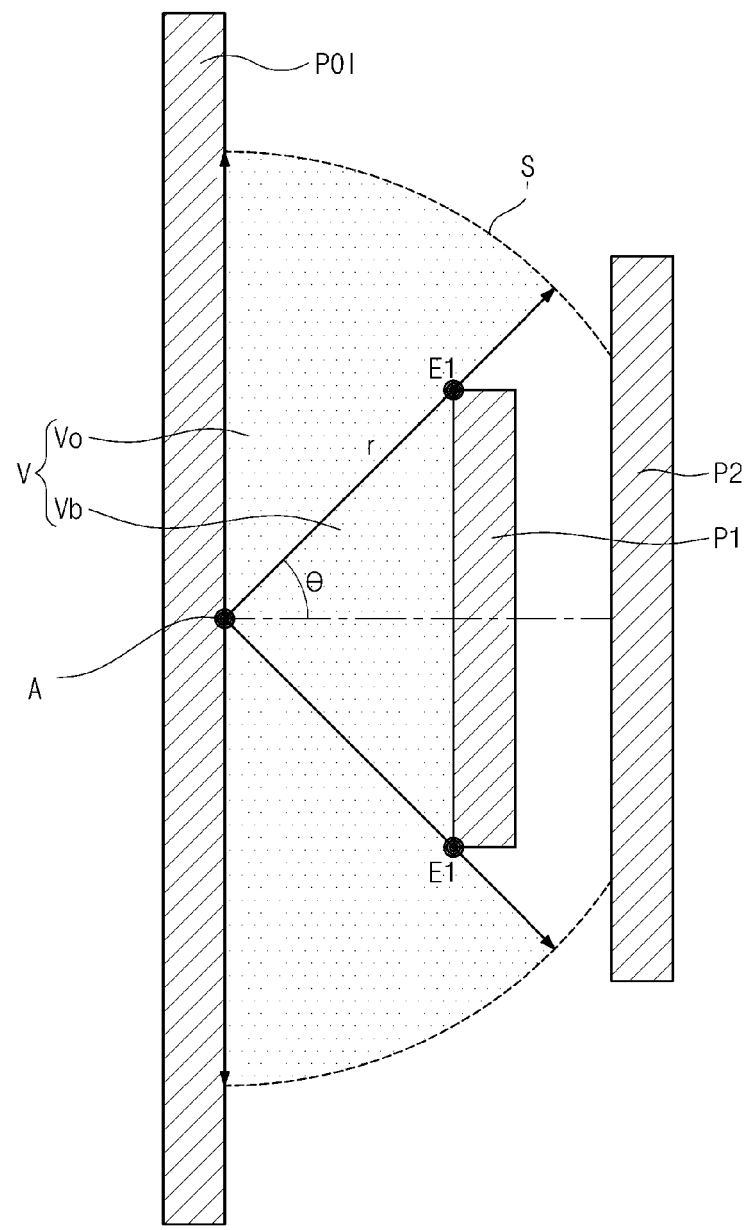
FIGS. 12A to 12C are plan views of a project area and a non-project area of a line target pattern blocked by a first neighboring pattern and a second neighboring pattern.
Figure 12B:
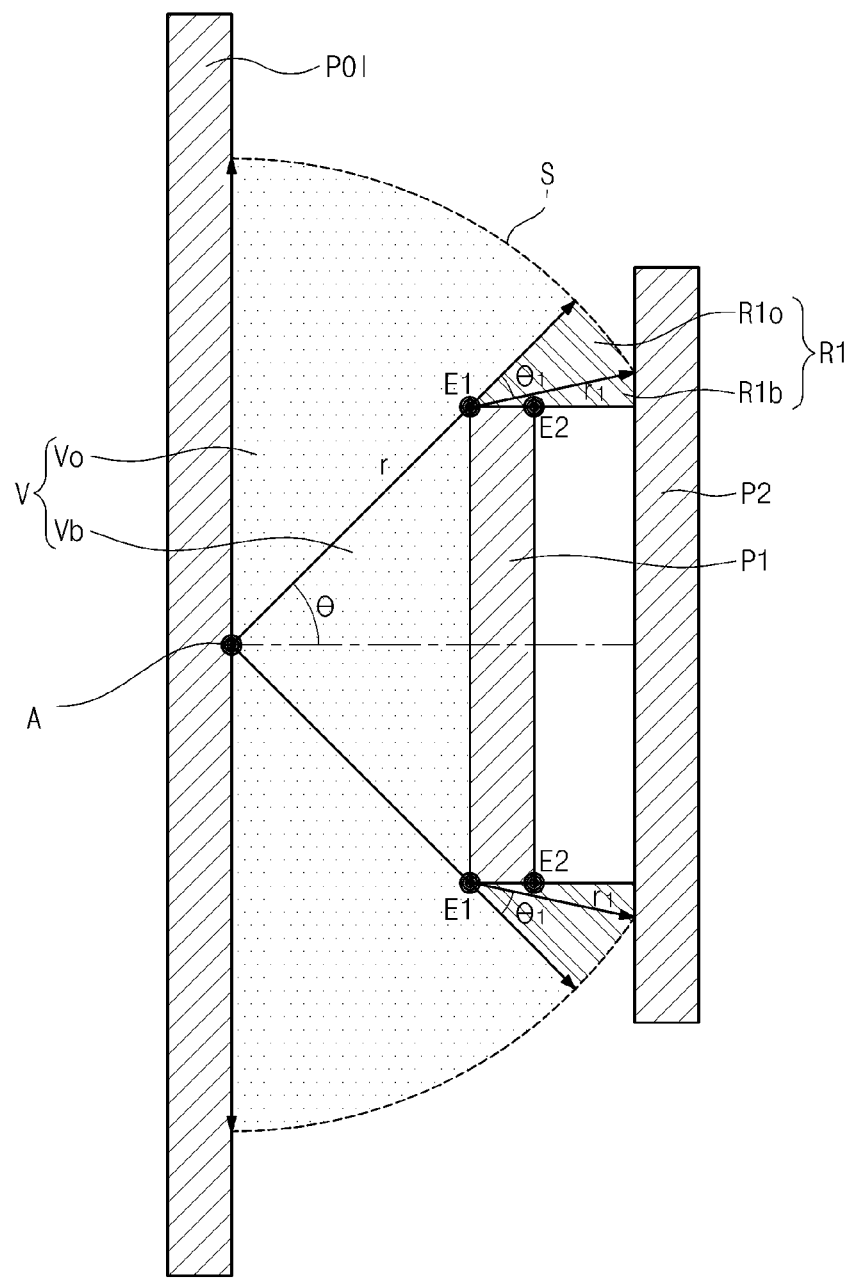
Figure 12C:
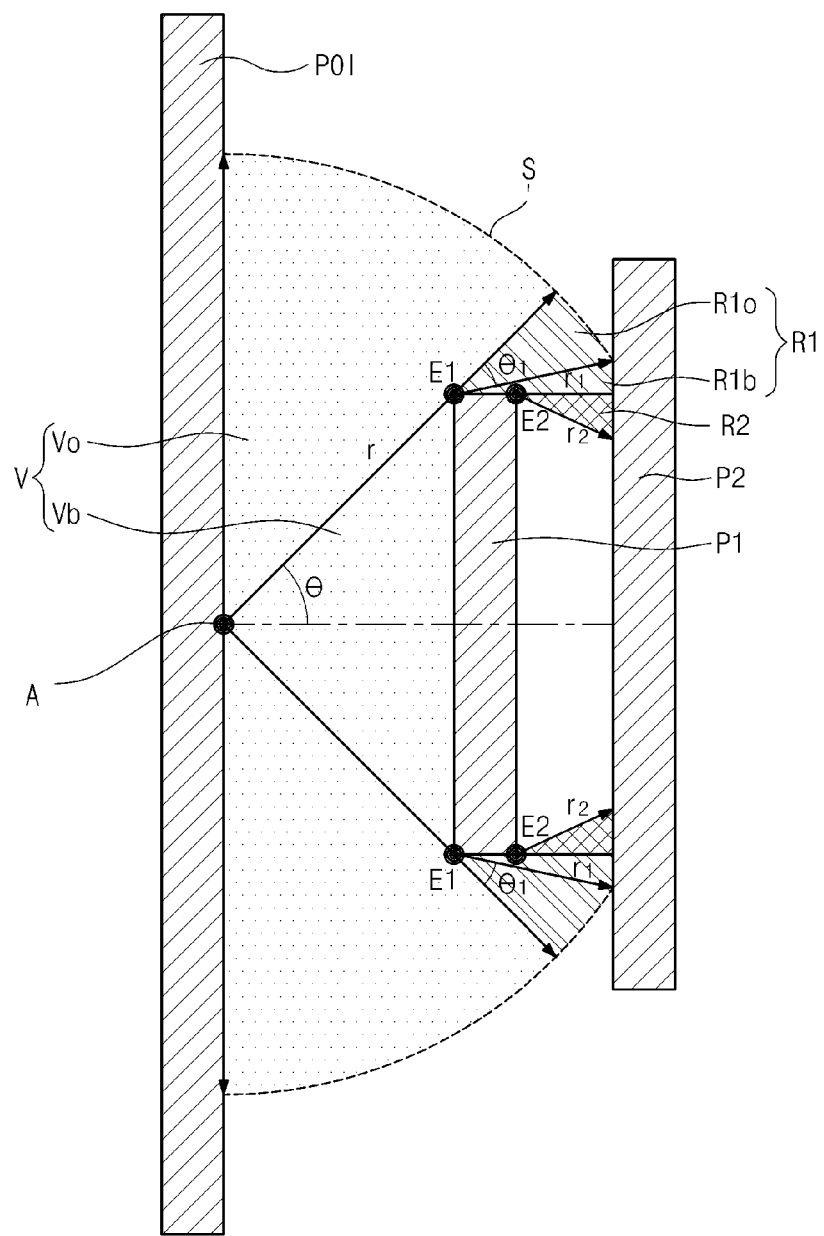

FIGS. 12A to 12C are plan views of a project area and a non-project area of a line target pattern blocked by a first neighboring pattern and a second neighboring pattern.

Referring to FIGS. 12A to 12C, a visible area of a long line target pattern P01 may include a project area V blocked by a first neighboring pattern P1, a first non-project area R1 bent at first edges E1 of the first neighboring pattern P1 and blocked by a second neighboring pattern P2, and a second non-project area R2 bent at second edges E2 of the first neighboring pattern P1 and blocked by the second neighboring pattern P2.

The project area V may include an open project area Vo and a block project area Vb blocked by the first neighboring pattern P1 blocked by the first neighboring pattern P1 within a proximity region S of a target position A. The first non-project area R1 may include a first open non-project area R1o, which is not blocked by the second neighboring pattern P2 from the first edges E1 to the outermost portion of the proximity region S and a first block non-project area R1b blocked by the second neighboring pattern P2. The second non-project area R2 may include a second block non-project area R2b blocked by the second neighboring pattern P2 at the second edges E2 of the first neighboring pattern P1. The second non-project area R2 may further include a second open non-project area R2o, which is not blocked by the second neighboring pattern P2 at the second edges E2 of the first neighboring pattern P1. The first open non-project area R1o and the second block project area R2b may correspond to an arc calculated into first and second linear distances $r_1$ and $r_2$ and first and second edge azimuthal angles $\theta_1$ and $\theta_2$. The first block non-project area R1b and the second block non-project area R2b may be calculated from the first and second linear distances $r_1$ and $r_2$ and a trigonometric function of the first and second edge azimuthal angles $\theta_1$ and $\theta_2$.

Thus, in the etch proximity correction method according to an embodiment of the present general inventive concept, the etch bias value may be calculated from the visible area including the projection area V, the first non-project area R1, and the second non-project area R2.

Referring again to FIGS. 5 and 6, the target position A within the target pattern P0 is corrected using the etch bias value in operation S260. As described above, the etch bias value may have become a measurement for predicting a distribution of an etch polymer at the target position A in the etch process. When the etch bias value is high, the target position A may be backward corrected in a center direction of the target pattern P0. When the etch bias value is low, the target position A may be forward direction in an outer direction of the target pattern P0. For example, an etch bias value calculated at the target position A is about 10 nm, the target position A may be movement-corrected by about −10 nm.

Whether an etch proximity correction with respect to all positions of the target pattern P0 is completed is determined in operation S260. Then, other target patterns of the patterns within the target layout may be selected in operation S210. Also, when the etch proximity correction with respect to all positions within the target layout is completed in operation S220, a measurement layout after developing may be created.

Thus, in the etch proximity correction method according to the present general inventive concept, the etch bias value may be accurately and precisely calculated from the etch bias model including the project area v and the non-project area R as the visible area when compared to a conventional etch proximity correction method.

Figure 13A:
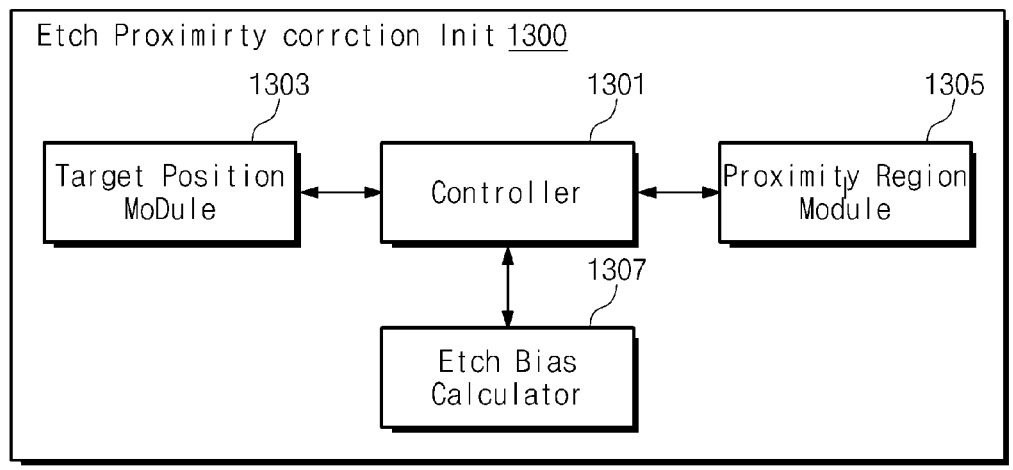

FIG. 13A is a block diagram illustrating an etch proximity correction unit for the etch proximity correction method according to an embodiment of the present general inventive concept.

According to the embodiment illustrated in FIG. 3A, the etch proximity correction unit 1300 may include a controller 1301 connected to the target position module 1303, a proximity region module 1305 and an etch bias calculator 1307. The controller 1301 oversees the functions of the target position module 1303, a proximity region module 1305 and an etch bias calculator 1307. The controller 1301 also determines whether etch proximity correction with respect to all patterns within a target layout is completed. If the controller 1301 determines that the etch proximity correction is not completed, then the controller 1301 communicates with the target position module 1303 so that the target position module 1303 sets a target position of a selected corresponding target pattern. Then, the controller 1301 causes the proximity region module 1305 to set a proximity region which affects the target position by an etch reaction when the target pattern is etch-patterned. Next, the controller 1301 causes the etch bias calculator 1307 to calculate an etch bias value based on the target position and the proximity region, as well as the project area and the non-project area. Once the etch bias value is calculated, the controller 1301 causes the target position module 1303 to correct the target position based on the etch bias value.

Figure 13B:
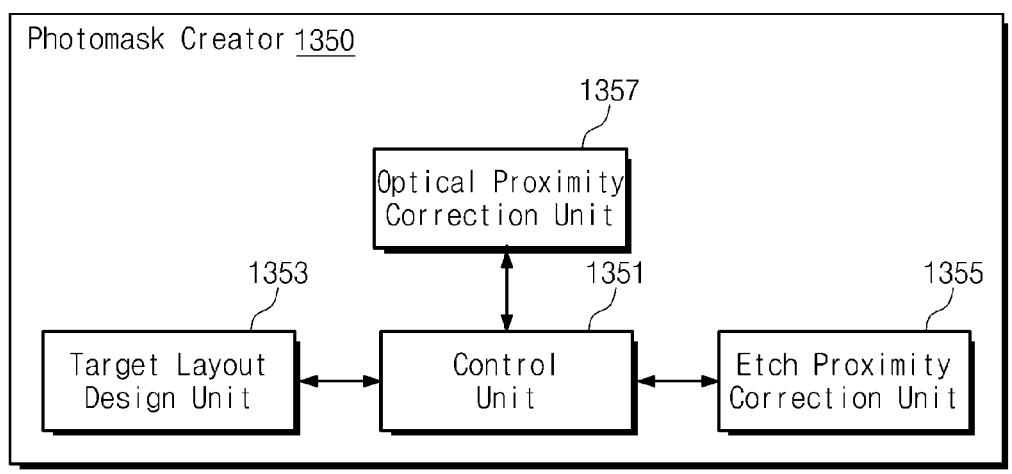

FIG. 13B is a block diagram illustrating a photomask creator according to an embodiment of the present general inventive concept.

According to the embodiment illustrated in FIG. 13B, the photomask creator 1350 includes a control unit 1351 connected to a target layout design unit 1353, an etch proximity correction unit 1355, and an optical proximity correction unit 1357. The control unit 1351 may cause the target layout design unit 1353 to design a target layout to be formed on a surface of a wafer. The control unit 1351 may then cause the etch proximity correction unit 1355 to perform etch proximity correction to develop the target layout, thereby creating a measurement layout for developing a photomask. The etch proximity correction unit 1355 may include the same features as the etch proximity correction unit 1300 of FIG. 13A. Next, the control unit 1351 causes the optical proximity correction unit 1357 to perform optical proximity correction on the measurement layout, which results in creating of a photomask layout.

Figure 13C:
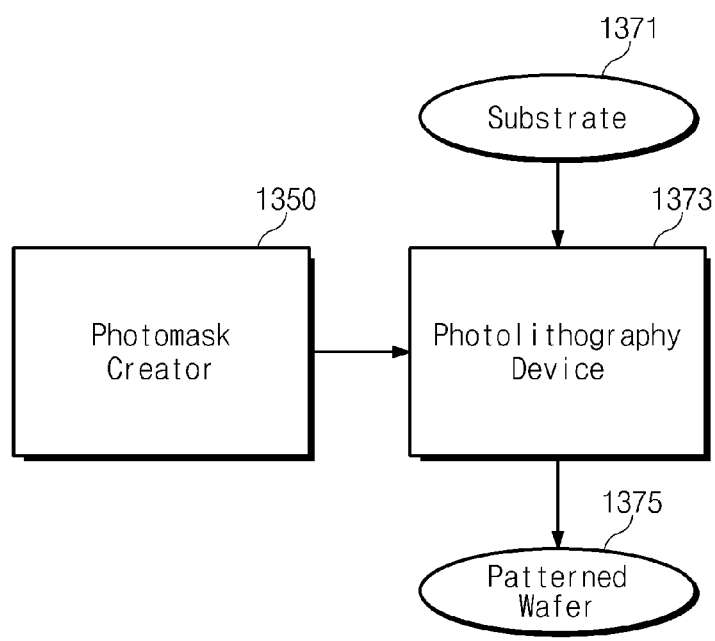

FIG. 13C is a block diagram illustrating the photolithography process using the photomask layout created by the photomask creator.

According to the embodiment illustrated in FIG. 13C, a substrate 1371 is provided to the photolithography device 1373 to undergo the photolithography process. The photomask creator 1350 creates a photomask layout, which is provided to the photolithography device 1373. The photolithography device 1373 may perform the photolithography process on the substrate 1371 based on this photomask layout, thereby creating a patterned wafer 1375.

Therefore, in the etch proximity correction method according to an embodiment of the present general inventive concept and the photomask layout creation method using the same, since the photomask layout accurately and precisely corrected in the target layout may be manufactured and the manufacturing costs of the photomask may be reduced, manufacturing yield and productivity may be increased or maximized.

According to an embodiment of the present general inventive concept, the etch bias value calculated from the project area and the non-project area may be equal or similar to the measured etch bias value. Thus, according to the etch proximity correction method of the present general inventive concept, since the accurately and precisely corrected photomask layout may be manufactured and the manufacturing costs of the photomask may be reduced, manufacturing yield and productivity may be increased or maximized.

The above-disclosed subject matter is to be considered illustrative and not restrictive, and the appended claims are intended to cover all such modifications, enhancements, and other embodiments, which fall within the true spirit and scope of the present general inventive concept. Thus, to the maximum extent allowed by law, the scope of the present general inventive concept is to be determined by the broadest permissible interpretation of the following claims and their equivalents, and shall not be restricted or limited by the foregoing detailed description.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of etch proximity correction, the method comprising:
    setting, a target position on an edge of a target pattern in a pattern region of a target layout;
    setting a proximity region affecting the target position by the etch reaction when the target pattern is etch-patterned;
    obtaining a project area radially extending from the target position toward an outermost portion of the proximity region and ending within the proximity region;
    obtaining a non-project area corresponding to an area extending past an end of the project area to the outermost portion of the proximity region;
    calculating an etch bias value using the project area, and the non-project area; and
    correcting the target position in the target pattern using the etch bias value and creating patterned wafer using the corrected target pattern.

2. The method of claim 1, wherein the etch bias value is determined from an etch bias model comprising a function of a visible area, a blocked area, and a pattern density.

3. The method of claim 2, wherein the visible area comprises the project area and the non-project area.

4. The method of claim 3, wherein the non-project area comprises a first non-project area projected into a first edge linear distance from a first edge of the pattern region blocked in the linear distance to the outermost potion of the proximity region and a second non-project area projected into a second edge linear distance from a second edge of the pattern region blocked in the first edge linear distance to the outermost portion of the proximity region.

5. The method of claim 4, wherein the non-project area comprises an open non-project area, which is not blocked by the pattern region within the first edge linear distance or the second edge linear distance and a block non-project area blocked by the pattern region within the edge linear distance.

6. The method of claim 5, wherein the open non-project area comprises an arc area calculated from the first edge linear distance or the second edge linear distance and a first edge azimuthal angle or a second edge azimuthal angle, and
    wherein the first edge linear distance or the second edge linear distance are rotated in the first edge azimuthal angle and the second edge azimuthal angle, respectively.

7. The method of claim 5, wherein the block non-project area comprises a triangular area calculated from the first edge linear distance or the second edge linear distance and a trigonometric function of a first edge azimuthal angle or a second edge azimuthal angle, and
    wherein the first edge linear distance or the second edge linear distance are rotated in the first edge azimuthal angle and the second edge azimuthal angle, respectively.

8. The method of claim 2, wherein the etch bias value of the visible area is calculated from a visible kennel function.

9. The method of claim 8, wherein the visible kennel function comprises a surface integral of the project area, which multiplies a first function depending on a variation of the linear distance by a second function depending on variations of the linear distance and an azimuthal angle.

10. The method of claim 9, wherein the visible kennel function further comprises a surface integral of the non-project area, which multiplies a third function depending on a variation of the edge linear distance from an edge position at which the linear distance meets the pattern region to the outermost portion of the proximity region by a fourth function depending on variation of an edge azimuthal angle and an edge linear distance at the edge position.

11. The method of claim 10, wherein the third function comprises at least one of a constant, a proportion function of the edge linear distance, an inverse function of the edge linear distance, an exponential function of the edge linear distance, and a Gaussian distribution function of the edge linear distance.

12. The method of claim 10, wherein the fourth function comprises at least one of a trigonometric function of the edge azimuthal angle, an exponential function of the edge azimuthal angle, and an exponential function of an ellipticity of the edge linear distance and the edge azimuthal angle.

13. The method of claim 8, wherein the first function comprises at least one of an inverse function of the linear distance and a Gaussian distribution function of the linear distance.

14. The method of claim 13, wherein the non-project area is calculated from an edge linear distance from a first edge of the target pattern meeting the linear distance to the outermost portion of the proximity region and an edge azimuthal angle at which the edge linear distance meets a second edge of the target pattern from the project region when the target pattern has an independent line shape having a length less than the linear distance of the proximity region.

15. The method of claim 13, wherein the non-project area is calculated from an edge linear distance from a first edge of the neighboring pattern meeting the linear distance to the outermost portion of the proximity region and an edge azimuthal angle at which the edge linear distance meets a second edge of the neighboring pattern from the project region.

16. The method of claim 8, wherein the second function comprises at least one of a constant, a trigonometric function of the azimuthal angle, an exponential function of the azimuthal angle, and an exponential function of an ellipticity of the linear distance and the azimuthal angle.

17. The method of claim 1, wherein the pattern region comprises a target pattern in which the target position is selected and at least one neighboring pattern adjacent to the target pattern within the proximity region of the target position.

18. A method of creating a photomask, comprising:
    designing a target layout comprising a pattern region;
    performing etch proximity correction to create a measurement layout; and
    performing optical proximity correction to create the photomask,
    wherein the performing of the etch proximity correction comprises:
        setting a target position on an edge of a target pattern in a pattern region of a target layout;
        setting a proximity region affecting the target position by the etch reaction when the target pattern is etch-patterned;
        obtaining a project area radially extending from the target position toward an outermost portion of the proximity region and ending within the proximity region;
        obtaining a non-project area corresponding to an area extending past an end of the project area to the outermost portion of the proximity region;
        calculating an etch bias value using the project area, and the non-project area; and
        correcting the target position in the target pattern using the etch bias value and creating patterned wafer using the corrected target pattern.

19. The method of claim 18, further comprising:
    creating a measurement layout after developing the target layout after the etch proximity correction is performed; and performing optical proximity correction of the pattern region in the measurement layout after developing.

20. The method of claim 19, wherein the optical proximity correction is performed using the same function as that of the etch proximity correction and a model having weighting factors different from each other.

* * * * *